United States Patent
Tallman et al.

(10) Patent No.: US 10,971,714 B2
(45) Date of Patent: Apr. 6, 2021

(54) BATTERY PACK AND A PRE-ASSEMBLED ELECTRICAL CONNECTION UNIT FOR THE BATTERY PACK

(71) Applicant: GM Global Technology Operations LLC, Detroit, MI (US)

(72) Inventors: Adam J. Tallman, Warren, MI (US); Zachary S. Mendla, Shelby Township, MI (US); Holly C. Schwarzwalder, Southfield, MI (US); Charanjit S. Chawa, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 198 days.

(21) Appl. No.: 16/354,660

(22) Filed: Mar. 15, 2019

(65) Prior Publication Data

US 2020/0295336 A1    Sep. 17, 2020

(51) Int. Cl.
   *H01M 2/20* (2006.01)
   *H01M 2/30* (2006.01)
   *H01M 2/10* (2006.01)

(52) U.S. Cl.
   CPC ......... *H01M 2/206* (2013.01); *H01M 2/1077* (2013.01); *H01M 2/30* (2013.01); *H01M 2220/20* (2013.01)

(58) Field of Classification Search
   CPC .................. H01M 2/30; H01M 2/202–208
   See application file for complete search history.

(56) References Cited

U.S. PATENT DOCUMENTS

| | | | | |
|---|---|---|---|---|
| 7,914,300 | B2* | 3/2011 | Akahori | H01R 4/305 |
| | | | | 439/76.2 |
| 9,912,091 | B1* | 3/2018 | Miyazawa | H01R 13/422 |
| 10,403,875 | B2* | 9/2019 | Subramanian | H01M 2/305 |
| 2011/0287299 | A1* | 11/2011 | Kim | H01M 2/202 |
| | | | | 429/158 |
| 2012/0288744 | A1* | 11/2012 | Guen | H01M 2/305 |
| | | | | 429/158 |
| 2013/0089760 | A1* | 4/2013 | Kim | H01M 2/34 |
| | | | | 429/61 |
| 2014/0205888 | A1* | 7/2014 | Kim | H01M 2/206 |
| | | | | 429/158 |
| 2015/0111426 | A1* | 4/2015 | Buettner | H02B 1/06 |
| | | | | 439/607.01 |
| 2015/0243946 | A1* | 8/2015 | Ahn | H01M 2/22 |
| | | | | 429/185 |

(Continued)

*Primary Examiner* — Matthew J Merkling
(74) *Attorney, Agent, or Firm* — Quinn IP Law

(57) ABSTRACT

A pre-assembled electrical connection unit for a battery pack includes a bus bar defining a hole, and a cage defines a cavity. The unit also includes a fastener disposed in the cavity and the cage surrounds the fastener. The cage is secured to the bus bar, and the fastener is positioned in the hole and the cavity in an initial position. The fastener is movable to a final position relative to the cage which positions the fastener deeper in the hole of the bus bar. The unit is positioned relative to the battery pack, and the battery pack includes a module terminal. The module terminal includes a terminal nut that is accessible during an assembly process. The unit is placed over the terminal nut during the assembly process such that the fastener aligns with the terminal nut and secures the bus bar to the module terminal in the final position.

19 Claims, 3 Drawing Sheets

(56) References Cited

U.S. PATENT DOCUMENTS

| | | | |
|---|---|---|---|
| 2016/0149191 A1* | 5/2016 | Farha | H01M 2/30 |
| | | | 429/121 |
| 2017/0149225 A1* | 5/2017 | Imai | H02G 5/025 |
| 2018/0034014 A1* | 2/2018 | Ichikawa | H01M 2/12 |
| 2018/0175362 A1* | 6/2018 | Hara | H01M 2/305 |
| 2019/0051882 A1* | 2/2019 | Nakayama | H01R 25/161 |
| 2019/0280278 A1* | 9/2019 | Morisaku | H01M 2/1077 |

\* cited by examiner

BATTERY PACK AND A PRE-ASSEMBLED ELECTRICAL CONNECTION UNIT FOR THE BATTERY PACK

INTRODUCTION

Electric vehicles and hybrid vehicles include a battery pack to supply power to drive one or more wheels of the vehicle during certain modes of operation. Fasteners are used to secure bus bars to terminals of the battery pack.

SUMMARY

The present disclosure provides a pre-assembled electrical connection unit for a battery pack. The unit includes a bus bar defining a hole, and a cage defining a cavity. The unit also includes a fastener disposed in the cavity. The cage surrounds the fastener. The cage is secured to the bus bar. The fastener is in an initial position which positions the fastener in the hole of the bus bar and the cavity of the cage. The fastener is movable from the initial position to a final position relative to the cage which positions the fastener deeper in the hole of the bus bar.

The present disclosure also provides a battery pack that includes a module terminal. The module terminal includes a battery cell therein, and includes a terminal nut that is accessible during an assembly process. The assembly also includes a pre-assembled electrical connection unit, as discussed above, which is positioned relative to the module terminal during the assembly process. The unit is placed over the terminal nut during the assembly process such that the fastener aligns with the terminal nut. The fastener is movable from the initial position to a final position relative to the cage which positions the fastener deeper in the hole of the bus bar and secures the bus bar to the module terminal.

The detailed description and the drawings or FIGS. are supportive and descriptive of the disclosure, but the claim scope of the disclosure is defined solely by the claims. While some of the best modes and other embodiments for carrying out the claims have been described in detail, various alternative designs and embodiments exist for practicing the disclosure defined in the appended claims.

DETAILED DESCRIPTION

Those having ordinary skill in the art will recognize that all directional references (e.g., above, below, upward, up, downward, down, top, bottom, left, right, vertical, horizontal, etc.) are used descriptively for the FIGS. to aid the reader's understanding, and do not represent limitations (for example, to the position, orientation, or use, etc.) on the scope of the disclosure, as defined by the appended claims. Furthermore, the term "substantially" can refer to a slight imprecision or slight variance of a condition, quantity, value, or dimension, etc., some of which that are within manufacturing variance or tolerance ranges.

Figure 1:
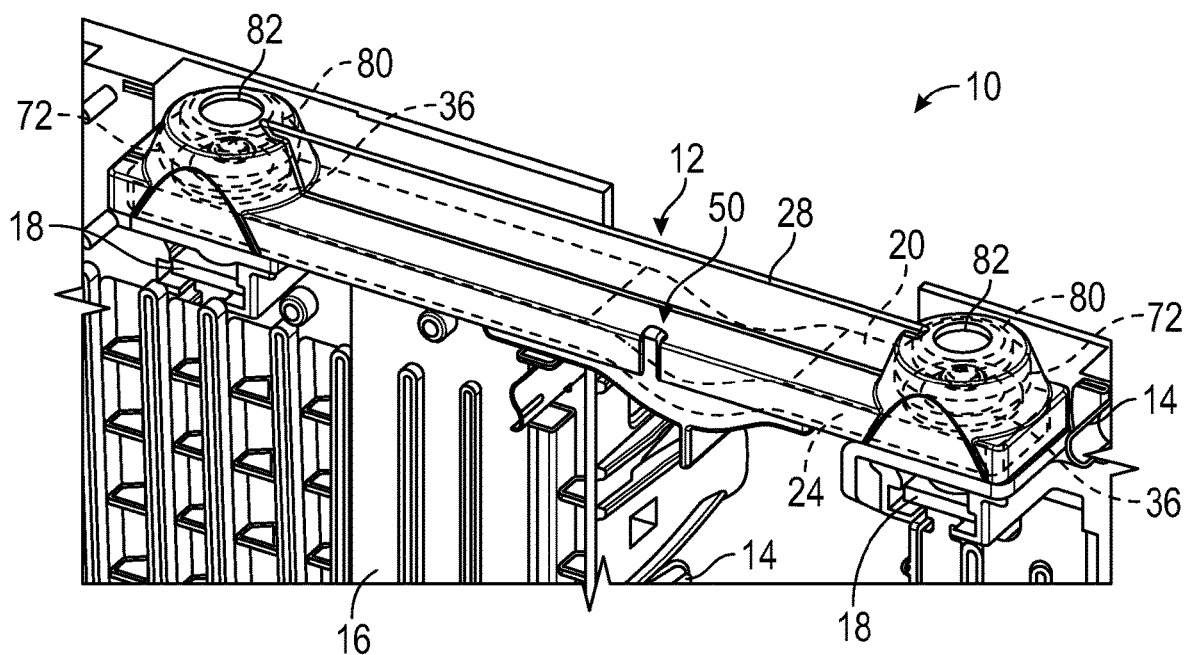
FIG. 1 is a schematic perspective fragmented view of a battery pack and a pre-assembled electrical connection unit.

Referring to the FIGS., wherein like numerals indicate like or corresponding parts throughout the several views, a battery pack 10 and a pre-assembled electrical connection unit 12 for the battery pack 10 are generally shown in FIG. 1.

Generally, the unit 12 is used to perform an assembly process to the battery pack 10. Continuing with FIG. 1, the battery pack 10 includes a module terminal 14, and the module terminal 14 includes a battery cell 16 therein. The module terminal 14 also includes a terminal nut 18 that is accessible during the assembly process. The unit 12 is positioned relative to the module terminal 14 during the assembly process. It is to be appreciated that the battery pack 10 may include a plurality of module terminals 14, and each of the module terminals 14 may include one or more battery cells 16.

Furthermore, in certain configurations, a plurality of the units 12 may be used depending on the number of module terminals 14 of the battery pack 10. The module terminal 14 may include more than one terminal nut 18 to electrically connect a plurality of module terminals 14 together, which is discussed further below. The below discussion addresses one unit 12, but applies to any number of units 12.

The battery pack 10 may be used in a vehicle, such as, but not limited to, an automobile, an off-road vehicle, a watercraft, an aircraft or any other suitable movable platform. As non-limiting examples, the vehicle may be a hybrid vehicle or an electric vehicle. The hybrid vehicle may include an internal combustion engine and one or more electric motors to drive wheels of the vehicle. The electric vehicle may include one or more electric motors to drive the wheels of the vehicle. The battery pack 10 may store power and/or provide power to operate the electric motors that drive the wheels of the vehicle. As another example, the battery pack 10 may store power and/or provide power to various auxiliary systems, such as a radio, one or more pumps, lights, etc. The battery pack 10 may also be used in a non-vehicle system, such as, a power plant, etc.

Figure 6:
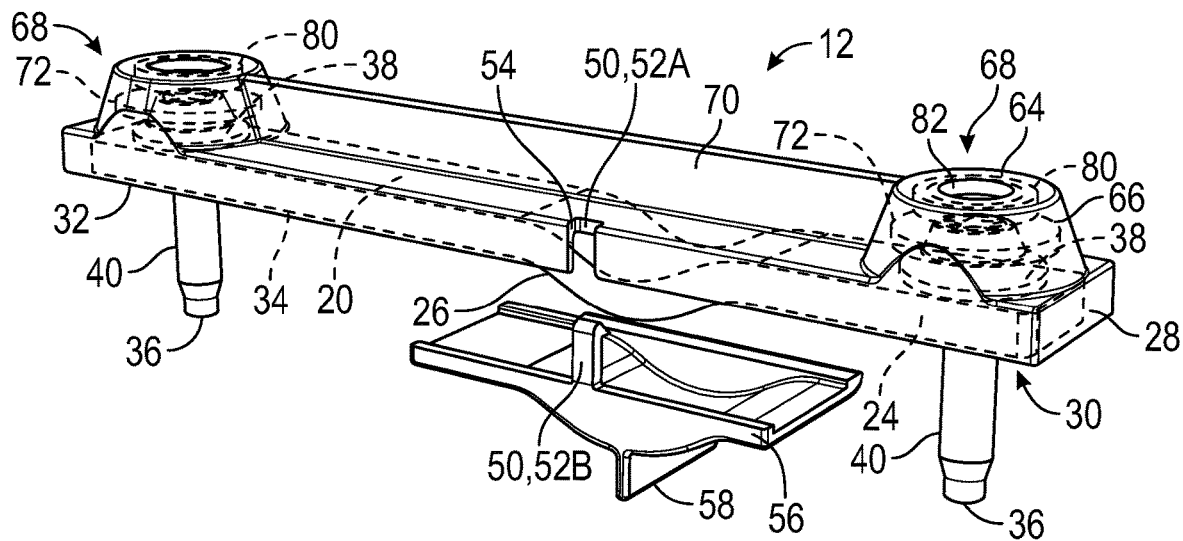
FIG. 6 is a schematic partial exploded perspective view of the unit to illustrate one example of a retention member.
Figure 2:
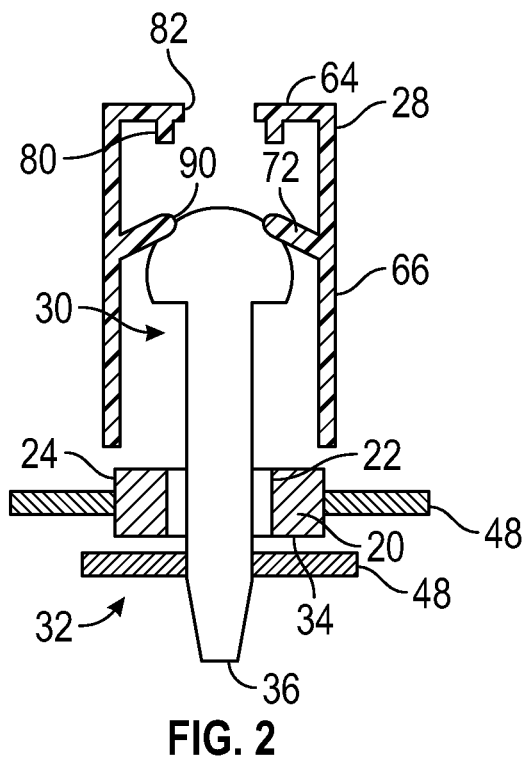
FIG. 2 is a schematic cross-sectional view of one example of coupling together a fastener, a bus bar and a cage of the unit.
Figure 7:
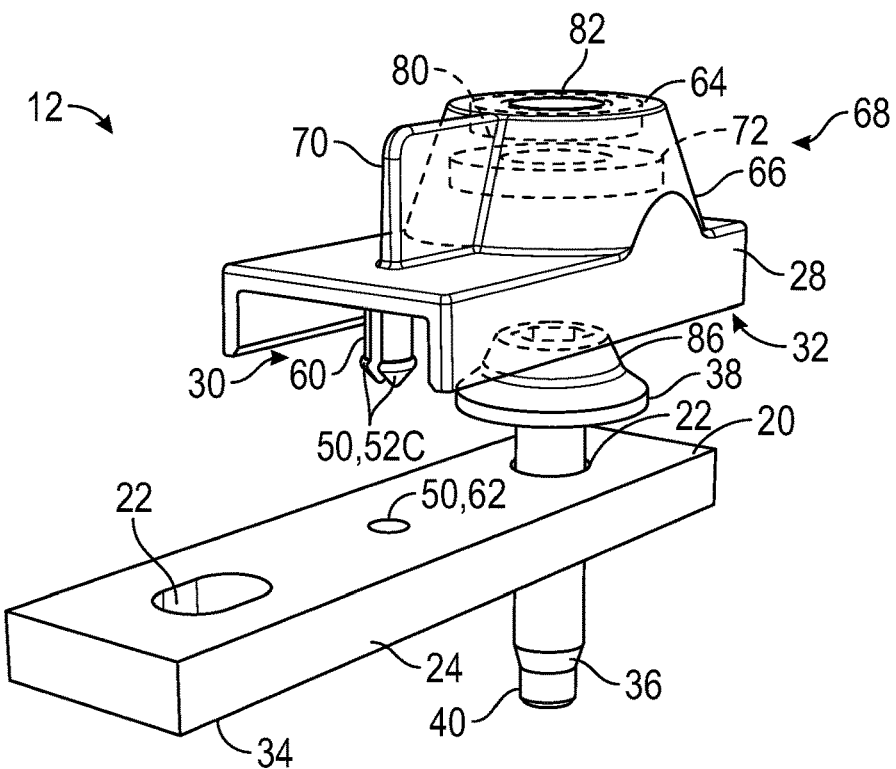
FIG. 7 is a schematic partial exploded perspective view of the unit to illustrate another example of a retention member.
Figure 8:
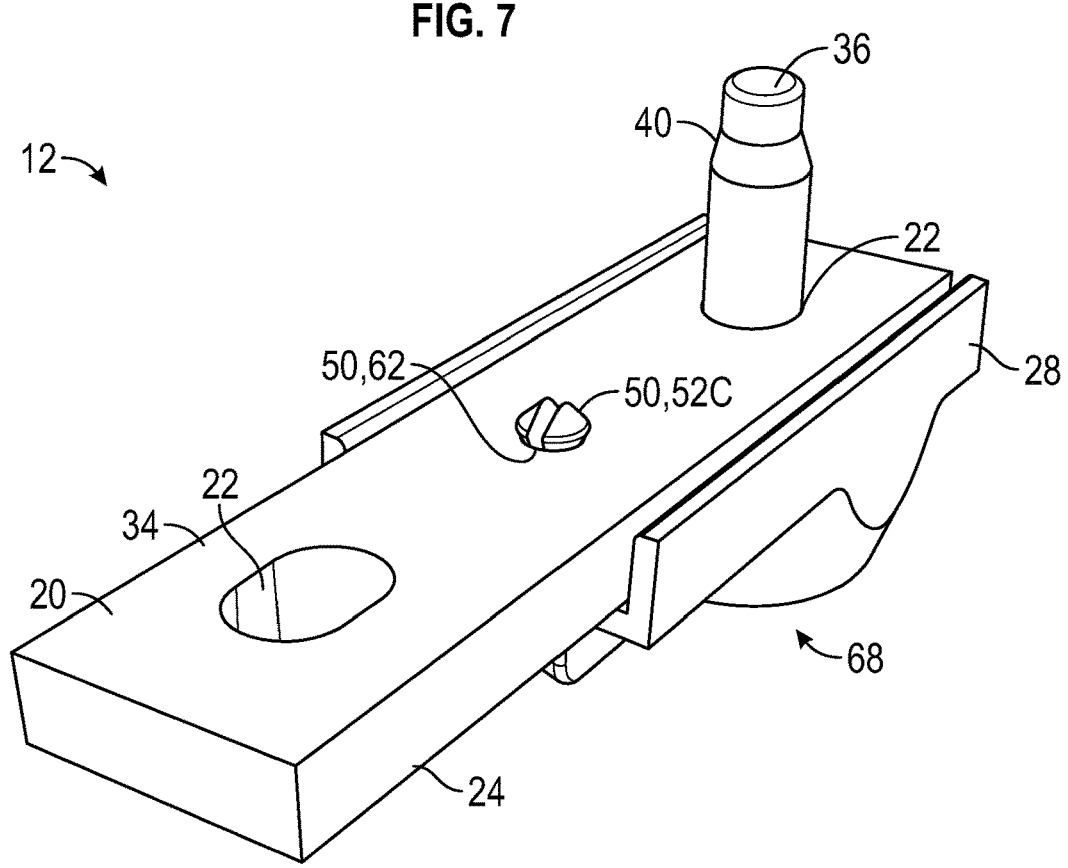
FIG. 8 is a schematic perspective view of the unit of FIG. 7 to illustrate the retention member of FIG. 7 from the opposite side of the bus bar.

Turning to FIGS. 2-5, the unit 12 includes a bus bar 20 defining a hole 22. The bus bar 20 may also include a side periphery 24 that surrounds and is spaced from the hole 22. The bus bar 20 is used to electrically connect the module terminal 14 to various components. For example, the bus bar 20 may electrically connect a pair of module terminals 14 together. When the bus bar 20 cooperates with the module terminal 14, the hole 22 of the bus bar 20 may align with the terminal nut 18. The bus bar 20 may be any suitable configuration, and non-limiting examples may include a substantially straight and flat configuration as shown in FIGS. 7 and 8 or may include one or more bulge portions 26 relative to one or more substantially straight and flat portions as shown in FIGS. 1 and 6.

Referring to FIGS. 1-5, the unit 12 also includes a cage 28 defining a cavity 30. Generally, the cage 28 is secured to the bus bar 20 such that the cage 28 surrounds the side periphery 24 of the bus bar 20. Therefore, during the assembly process, most of the bus bar 20 is contained or covered by the cage 28. The cage 28 may define an access point 32, and the bus bar 20 may include a back surface 34 that is exposed outside of the cage 28. The bus bar 20 may be secured to the cage 28 such that the access point 32 is closed by the bus bar 20. The back surface 34 of the bus bar 20 faces the module terminal 14 during the assembly process. A portion of the back surface 34 of the bus bar 20 engages the module terminal 14 when the unit 12 is mounted to the battery pack 10.

Referring to FIGS. 2-5, the unit 12 includes a fastener 36 disposed in the cavity 30 and the cage 28 surrounds the fastener 36. As discussed further below, the cage 28 prevents certain access to the fastener 36 during the assembly process. Generally, the unit 12 is placed over the terminal nut 18 during the assembly process such that the fastener 36 aligns with the terminal nut 18. Once the unit 12 is placed in the desired location relative to the module terminal 14, the fastener 36 is driven through the bus bar 20 and secured to the terminal nut 18 to complete the assembly process. As discussed further below, the cage 28 provides the desired orientation or alignment of the fastener 36 relative to the terminal nut 18 during the assembly process.

The fastener 36 may be any suitable configuration, and non-limiting examples are discussed below and illustrated. Generally, the fastener 36 may include a head portion 38 and a threaded portion 40. The head portion 38 of the fastener 36 has a first outer diameter 42 and the threaded portion 40 of the fastener 36 has a second outer diameter 44, with the first outer diameter 42 being larger than the second outer diameter 44. Therefore, when the fastener 36 is being driven into the terminal nut 18, the threaded portion 40 is smaller than the hole 22 of the bus bar 20 to fit into the hole 22 but the head portion 38 is larger than the hole 22 of the bus bar 20 so the fastener 36 abuts or stops against the bus bar 20 to secure the bus bar 20 to the module terminal 14.

The terminal nut 18 may define a hollow 46 that receives part of the fastener 36, and more specifically, receives part of the threaded portion 40. The threaded portion 40 of the fastener 36 may include threads, and the terminal nut 18 may include threads complementary to the threads of the threaded portion 40 to secure the fastener 36 to the terminal nut 18. The threads of the terminal nut 18 may be disposed inside the hollow 46. It is to be appreciated that the fastener 36 and the terminal nut 18 may be configured to provide a friction fit without threads or be any other suitable configuration to secure the fastener 36 to the terminal nut 18.

The fastener 36 is assembled to the cage 28 before the assembly process begins with the battery pack 10. The fastener 36 and the cage 28 may be pre-assembled by any suitable methods. As one example, the fastener 36 may be inserted into the cavity 30 of the cage 28 through the access point 32. One or more fixtures 48 may be used to position the fastener 36 and the bus bar 20 relative to each other, and then the cage 28 is positioned over the fastener 36, and the cage 28 and/or the fastener 36 with the bus bar 20 may move to insert the fastener 36 into the cavity 30 through the access point 32. As another example, the cage 28 may be molded, such as overmolded relative to the fastener 36, and after the overmolding process, the bus bar 20 may be secured to the cage 28 to close the access point 32. As yet another example, the cage 28 may be molded, such as injection molded. It is to be appreciated that the cage 28 may be formed by any suitable method and/or process, and the above discussion are non-limiting examples.

Figure 3:
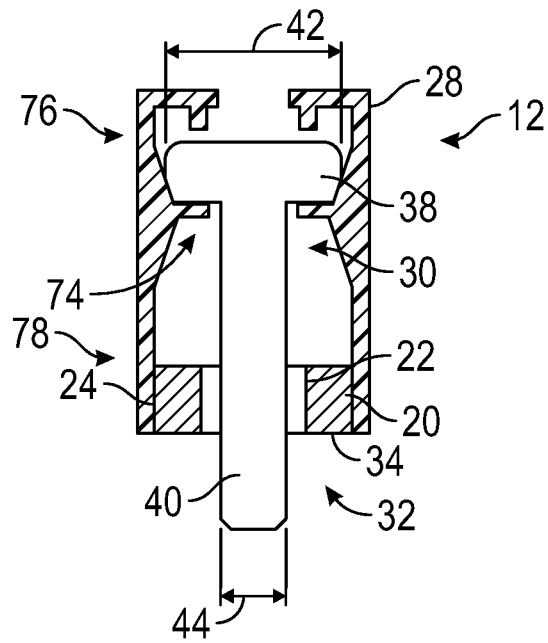
FIG. 3 is a schematic cross-sectional view of the fastener resting on a first flange in an initial position inside the cage.

The fastener 36 is movable relative to the cage 28 and the bus bar 20 during the assembly process. The cage 28 is secured to the bus bar 20, and the fastener 36 is in an initial position which positions the fastener 36 in the hole 22 of the bus bar 20 and the cavity 30 of the cage 28. The initial position is best shown in FIG. 3. Therefore, when the fastener 36 and the cage 28 are assembled together before the assembly process, the fastener 36 is positioned in the initial position relative to the cage 28. The cage 28 may be secured to the bus bar 20 in different configurations, and non-limiting examples are discussed below and illustrated. Furthermore, the cage 28 may be any suitable configurations, and non-limiting examples of various features of the cage 28 are discussed below and illustrated.

Referring to FIGS. 1 and 6-8, the cage 28 may include a retention feature 50 that engages the bus bar 20 to secure the cage 28 to the bus bar 20. The retention feature 50 may be various configurations, and non-limiting examples are discussed below and illustrated.

In certain configurations, as shown in FIGS. 1 and 6, part of the retention feature 50 may be a feature of the cage 28 and another part of the retention feature 50 may be a separate and independent piece that engages the retention feature 50 of the cage 28 to maintain the position of the bus bar 20 relative to the cage 28. For example, the retention feature 50 of the cage 28 includes a catch 52A, and in certain embodiments, the cage 28 may define a recess 54 and the catch 52A is exposed in the recess 54. Therefore, the part of the retention feature 50 of the cage 28 may include the catch 52A and/or the recess 54. The another part of the retention feature 50 may be a shell 56 that overlaps the bus bar 20 such that the bus bar 20 is disposed between part of the shell 56 and the cage 28. The shell 56 includes a catch 52B that engages the catch 52A of the cage 28 to secure the bus bar 20 to the cage 28. The catch 52A of the cage 28 and the catch 52B of the shell 56 may be any suitable configuration, and non-limiting examples of the catches 52A, 52B may include one or more of: an angled surface, a flat surface, a tab, a clip, a frictional engagement between surfaces, a protrusion, a lip, a latch, etc. For illustrative purposes, in FIGS. 1 and 6, the catch 52A of the cage 28 is a lip, and the catch 52B of the shell 56 is a tab.

Furthermore, continuing with FIGS. 1 and 6, the shell 56 may also include a projection 58 that ensures that the bus bar 20 will be installed into the battery pack 10 in the desired orientation. In other words, if the bus bar 20 is in the wrong orientation, the projection 58 will engage undesired parts of the battery pack 10 and the unit 12 will not be able to be installed into the battery pack 10. The projection 58 may also optionally act as a handle for assembly purposes.

In certain configurations, as shown in FIGS. 7 and 8, part of the retention feature 50 may be a feature of the cage 28 and another part of the retention feature 50 may be a feature of the bus bar 20. For example, the retention feature 50 of the cage 28 includes a catch 52C, and in certain embodiments, the retention feature 50 of the cage 28 may also include a post 60 having the catch 52C. Therefore, the part of the retention feature 50 of the cage 28 may include the catch 52C and/or the post 60. The bus bar 20 may define an opening 62 that receives the catch 52C of the cage 28 to secure the cage 28 to the bus bar 20. The another part of the retention feature 50 of the bus bar 20 may include the opening 62. The catch 52C of the cage 28 may engage the bus bar 20 in the opening 62 and/or the catch 52C may engage the bus bar 20 outside of the opening 62 to secure the cage 28 to the bus bar 20. Therefore, in certain configurations, the catch 52C of the cage 28 may engage the back surface 34 of the bus bar 20. The post 60 may be biasable to allow the catch 52C to bias into the opening 62 and bias back to partially overlap the back surface 34 of the bus bar 20. Furthermore, the post 60 may be a plurality of pieces, with a portion of the catch 52C disposed on one of the pieces and another portion of the catch 52C disposed on another one of the pieces, and so on depending on the number of pieces. The bus bar 20 adjacent to the opening 62 may optionally include a catch. The catch 52C of the cage 28, and the optional catch of the bus bar 20, may be any suitable configuration, and non-limiting examples of the catch 52C may include one or more of: an angled surface, a flat surface, a tab, a clip, a frictional engagement between surfaces, a protrusion, a lip, a latch, etc. For illustrative purposes, in FIGS. 7 and 8, the catch 52C of the cage 28 is a protrusion, and the post 60 has a plurality of pieces with part of the protrusion on each of the pieces.

The cage 28 may be any suitable configuration to house the fastener 36 and expose the back surface 34 of the bus bar 20, and non-limiting examples are discussed below. For example, the cage 28 may include a top wall 64 and a side wall 66 disposed transverse to the top wall 64. The top wall 64 and the side wall 66 may cooperate to dispose the cavity 30 therebetween or surround the cavity 30. Generally, the side wall 66 may surround the fastener 36. Said differently, the cage 28 may include a raised portion 68 defined by the sidewall and the top wall 64, and the fastener 36 is disposed in the raised portion 68. It is to be appreciated that the cage 28 may house more than one fastener 36, and therefore, the cage 28 may include a plurality of raised portions 68, with one of the fasteners 36 disposed in each of the raised portions 68.

Optionally, as best shown in FIGS. 6 and 7, the cage 28 may include one or more ribs 70 exposed outside of the cavity 30. The rib(s) 70 may be disposed between raised portions 68. The rib 70 may add rigidity to the cage 28 and/or the rib 70 may be used as a handle for assembly purposes.

Referring to FIGS. 2-5, the cage 28 may include a first flange 72 that protrudes outwardly into the cavity 30, and more specifically, outwardly into the cavity 30 in a first orientation. Generally, the fastener 36, and more specifically a portion of the fastener 36, rests on the first flange 72 when the fastener 36 is in the initial position. In certain configurations, the portion of the fastener 36 may include the head portion 38. Therefore, the head portion 38 rests on the first flange 72 when the fastener 36 is in the initial position. Furthermore, in certain configurations, the first flange 72 protrudes outwardly into the cavity 30 from the side wall 66. Therefore, the first flange 72 may protrude outwardly in the first orientation relative to the side wall 66.

In one configuration, the first flange 72 is one first flange 72 that protrudes outwardly into the cavity 30. Therefore, the one first flange 72 may be continuous such that there is no end, and thus, forms a ring. Alternatively, the one first flange 72 may not be continuous such that there are two ends that do not join. Furthermore, in certain configurations, the first flange 72 may be further defined as a plurality of first flanges 72 spaced from each other, and protruding outwardly into the cavity 30.

Continuing with FIGS. 2-5, the first flange 72 may define a gap 74, and another portion of the fastener 36 is disposed in the gap 74 when the fastener 36 is in the initial position. In certain configurations, the another portion of the fastener 36 may include the threaded portion 40. Generally, the head portion 38 engages the first flange 72 and the threaded portion 40 fits between the first flange 72 when the fastener 36 is in the initial position. Therefore, in certain configurations, when the fastener 36 is in the initial position, the threaded portion 40 is disposed through the gap 74. The gap 74 substantially aligns with the hole 22 of the bus bar 20 which aligns the fastener 36 relative to the hole 22. As such, the threaded portion 40 is disposed in the gap 74 and the hole 22 when the fastener 36 is in the initial position.

Continuing with FIGS. 2-5, generally, the first flange 72 splits the cavity 30 into a first chamber 76 and a second chamber 78. The head portion 38 is disposed in the first chamber 76 when the fastener 36 is in the initial position. The threaded portion 40 is partially disposed in the second chamber 78 when the fastener 36 is in the initial position. Furthermore, part of the threaded portion 40 may be disposed outside cage 28 and outside of the bus bar 20 when the fastener 36 is in the initial position (see FIG. 3). The fastener 36 is movable relative to the first and second chambers 76, 78, which is discussed further below.

Continuing with FIGS. 2-5, the cage 28 may also include a second flange 80 that protrudes outwardly into the cavity 30 in a second orientation. Generally, the second flange 80 is disposed in the first chamber 76. The first orientation of the first flange 72 and the second orientation of the second flange 80 may be different from each other, and in certain configurations, the first and second orientations are transverse relative to each other. In one example, the first and second orientations are substantially ninety degrees relative to each other. The first and second flanges 72, 80 cooperate with each other to position the head portion 38 of the fastener 36 in a desired orientation.

In certain configurations, the second flange 80 protrudes outwardly into the cavity 30 from the top wall 64. Therefore, generally, the second flange 80 protrudes toward the first flange 72. The portion of the fastener 36 is disposed between the first and second flanges 72, 80 when the fastener 36 is in the initial position. More specifically, the portion of the fastener 36 is disposed between the first and second flanges 72, 80 in the first chamber 76 when the fastener 36 is in the initial position to prevent tilting of the fastener 36 in the cavity 30, and/or to align the fastener 36 in the cavity 30 relative to the terminal nut 18. By positioning the portion of the fastener 36 between the first and second flanges 72, 80, the fastener 36 is positioned in the desired orientation or alignment for the assembly process to the battery pack 10.

More specifically, the head portion 38 of the fastener 36 is disposed between the first and second flanges 72, 80 in the first chamber 76 when the fastener 36 is in the initial position to align the threaded portion 40 of the fastener 36 with the hole 22 of the bus bar 20. Therefore, the threaded portion 40 is disposed in the gap 74, the second chamber 78 and the hole 22 of the bus bar 20 when the fastener 36 is in the initial position. As such, the head portion 38 of the fastener 36 is disposed between the first and second flanges 72, 80 in the first chamber 76 when the fastener 36 is in the initial position to prevent tilting of the fastener 36 in the cavity 30, and/or to align the threaded portion 40 of the fastener 36 relative to the hollow 46 of the terminal nut 18. The head portion 38 of the fastener 36 may abut the second flange 80 or a small space may be between disposed between the head portion 38 of the fastener 36 and the second flange 80 as long as the desired orientation of the fastener 36 is achievable.

In one configuration, the second flange 80 is one second flange 80 that protrudes outwardly into the cavity 30. Therefore, the one second flange 80 may be continuous such that there is no end, and thus, forms a ring. Alternatively, the one second flange 80 may not be continuous such that there are two ends that do not join. Furthermore, in certain configurations, the second flange 80 may be further defined as a plurality of second flanges 80 spaced from each other, and protruding outwardly into the cavity 30.

Referring to FIGS. 1-5, generally, the cage 28 is designed to limit access to the fastener 36 and the bus bar 20 to prevent certain objects from entering the cavity 30. Therefore, the cage 28 defines a slot 82 to allow access to the fastener 36 but also prevent access of other objects. The cage 28 remains secured to the bus bar 20 to allow easy install and uninstall of the bus bar 20 to the module terminal 14 through the slot 82. As such, the cage 28 is designed such that no parts of the cage 28 need to be removed or opened in order to install and uninstall the bus bar 20 from the module terminal 14.

The slot 82 allows access to the cavity 30 and the fastener 36, and more specifically, access to the fastener 36 when the fastener 36 is in the initial position. In certain configurations, the top wall 64 defines the slot 82 to access the cavity 30 and the fastener 36 in the first chamber 76 when the fastener 36 is in the initial position. Generally, the slot 82 is spaced from the first and second flanges 72, 80. In certain configurations, the second flange 80 surrounds the slot 82. Additionally, the slot 82 aligns with the hole 22 of the bus bar 20. Therefore, the slot 82 of the top wall 64, the gap 74 of the first flange 72 and the hole 22 of the bus bar 20 align with each other, and thus, the fastener 36 is disposed in a desired position inside the cage 28 relative to the hole 22 of the bus bar 20 during the assembly process.

The slot 82 is sized to allow access to the fastener 36 via a tool 84 (see FIG. 4) but also sized to prevent other objects from accessing the fastener 36 inside the cavity 30. For example, the slot 82 is sized to prevent a user's fingers, etc., from accessing the cavity 30 of the cage 28. Therefore, the cage 28 is designed to prevent certain objects from engaging or touching any of the electrical parts, for example, the bus bar 20, the fasteners 36 inside the cavity 30 when the fasteners 36 are secured to the module terminal 14. The head portion 38 of the fastener 36 may include an outer surface 86 that is engaged via the tool 84 to move the fastener 36. The outer surface 86 of the head portion 38 may be recessed below the slot 82 of the cage 28, may protrude above the slot 82 of the cage 28 or may be flush in the slot 82 of the cage 28.

Figure 5:
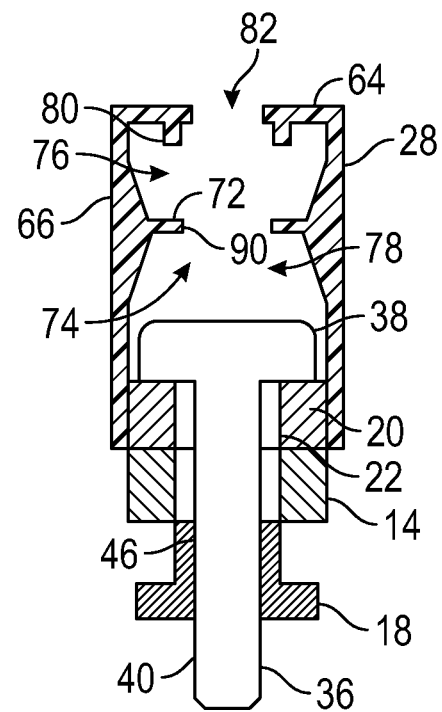
FIG. 5 is a schematic cross-sectional view of the fastener engaging the bus bar in a final position, and the fastener is secured to a terminal nut of a module terminal in the final position.

Generally, the unit 12 is placed over the module terminal 14 and the fastener 36 is used to secure the unit 12 to the module terminal 14. Therefore, during the assembly process, the fastener 36 is movable relative to the cage 28. The fastener 36 is movable from the initial position to a final position relative to the cage 28 which positions the fastener 36 deeper in the hole 22 of the bus bar 20, and in certain configurations, secures the bus bar 20 to the module terminal 14. As such, the fastener 36 is movable from the first chamber 76 in the initial position to the final position which positions the fastener 36 in the second chamber 78 and deeper in the hole 22 of the bus bar 20, such that the head portion 38 of the fastener 36 engages the bus bar 20 when in the final position. The final position is best shown in FIG. 5.

Generally, a force 88 is applied to the fastener 36 through the slot 82 to move the fastener 36 from the initial position to the final position. For example, the tool 84 may be used to apply the force 88 to the fastener 36, which moves the fastener 36 from the initial position to the final position. The tool 84 may screw the threaded portion 40 of the fastener 36 into the threads of the hollow 46 of the terminal nut 18. Non-limiting examples of the tool 84 may include a drill, a ratchet, a wrench, an impact tool, a driver, a screw driver, etc., or any other suitable tool to attach the fastener 36 to the terminal nut 18.

Figure 4:
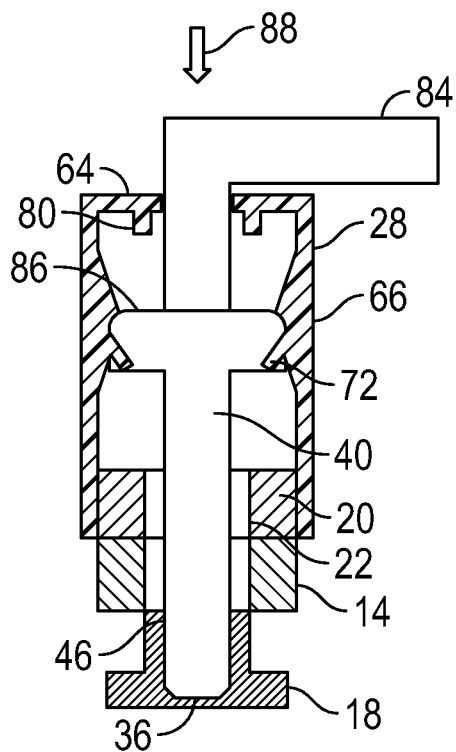
FIG. 4 is a schematic cross-sectional view of a tool applying a force to the fastener and flexing the first flange outwardly.

Referring to FIG. 4, the fastener 36 flexes the first flange 72 outwardly as the fastener 36 moves from the first chamber 76 to the second chamber 78 and the fastener 36 is secured to the terminal nut 18. Specifically, the force 88 is applied to the head portion 38, and the head portion 38 applies the force 88 to the first flange 72 which flexes the first flange 72 outwardly as the fastener 36 moves from the initial position to the final position. More specifically, the fastener 36 is movable from the first chamber 76 in the initial position to the final position by the force 88 applied to the head portion 38 of the fastener 36 which flexes the first flange 72 outwardly toward the side wall 66 as the head portion 38 of the fastener 36 moves from the first chamber 76 to the second chamber 78.

The first flange 72 is formed of any suitable material to allow the first flange 72 to move when the fastener 36 is initially assembled to the cage 28 and when the fastener 36 moves from the initial position to the final position. The first flange 72 remains secured to the cage 28 after the first flange 72 flexes. In other words, the first flange 72 does not detach from the cage 28 due to the movement of the first flange 72. As a non-limiting example, the first flange 72 may be formed of one or more polymers. More specifically, the polymers may include nylon, polycarbonate and combinations thereof. As one specific non-limiting example of a suitable nylon, the nylon may be a non-filled nylon. As one specific non-limiting example of a suitable polycarbonate, the polycarbonate may be a 20% talc polycarbonate. Furthermore, it is to be appreciated that the cage 28 and/or the second flange 80 may be formed of the same material(s) as the first flange 72 or different material(s).

Additionally, the first flange 72 includes an outer edge 90 adjacent to the gap 74, and the outer edge 90 may be any suitable configuration to assist in allowing the head portion 38 of the fastener 36 to pass between the first and second chambers 76, 78. As non-limiting examples, the outer edge 90 may be curved (see FIG. 2), tapered, sloped, flat (see FIG. 3-5), angled or any other suitable configuration to allow the fastener 36 to pass the first flange 72.

Once the fastener 36 is in the final position, the fastener 36 is secured to the terminal nut 18. The head portion 38 of the fastener 36 is disposed in the second chamber 78 when the fastener 36 is in the final position. Furthermore, the head portion 38 abuts or engages the bus bar 20 when in the final position to secure the bus bar 20 to the module terminal 14, and specifically, to the terminal nut 18. No portion of the fastener 36 is disposed in the first chamber 76 when the fastener 36 is in the final position. The assembly process is complete when the fastener 36 is secured to the terminal nut 18. Furthermore, the unit 12 remains secured to module terminal 14 when the assembly process is complete. In other words, the cage 28 is not removed from the bus bar 20 after the bus bar 20 is secured to the battery pack 10. If it is desirable to uninstall the unit 12 from the battery pack 10, then the tool 84 may access the fastener 36 (in the final position) through the slot 82 and unfasten the fastener 36 from the terminal nut 18.

While the best modes and other embodiments for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A pre-assembled electrical connection unit for a battery pack, the unit comprising:
    a bus bar defining a hole;
    a cage defining a cavity;
    a fastener disposed in the cavity and the cage surrounds the fastener;
    wherein the cage is secured to the bus bar, and the fastener is in an initial position which positions the fastener in the hole of the bus bar and the cavity of the cage;
    wherein the fastener is movable from the initial position to a final position relative to the cage which positions the fastener deeper in the hole of the bus bar; and
    wherein the cage includes a first flange and a second flange that each protrude outwardly into the cavity in an orientation different from each other.

2. The unit as set forth in claim 1 wherein the first flange protrudes outwardly into the cavity in a first orientation.

3. The unit as set forth in claim 2 wherein:
    the first flange defines a gap; and
    a portion of the fastener rests on the first flange and another portion of the fastener is disposed in the gap when the fastener is in the initial position.

4. The unit as set forth in claim 3 wherein:
    the second flange protrudes outwardly into the cavity in a second orientation;
    the first orientation of the first flange is transverse relative to the second orientation of the second flange; and
    the portion of the fastener is disposed between the first and second flanges when the fastener is in the initial position.

5. The unit as set forth in claim 3 wherein:
    the fastener includes a head portion and a threaded portion;
    the head portion rests on the first flange when the fastener is in the initial position; and
    the threaded portion is disposed in the gap and the hole when the fastener is in the initial position.

6. The unit as set forth in claim 4 wherein the cage defines a slot to access the cavity and the fastener in the initial position, and wherein the slot is spaced from the first and second flanges.

7. The unit as set forth in claim 5 wherein the first flange splits the cavity into a first chamber and a second chamber, and wherein the head portion is disposed in the first chamber when the fastener is in the initial position.

8. The unit as set forth in claim 7 wherein the fastener is movable from the first chamber in the initial position to the final position which positions the fastener in the second chamber and deeper in the hole of the bus bar, such that the head portion of the fastener engages the bus bar when in the final position.

9. The unit as set forth in claim 8 wherein the head portion applies a force to the first flange which flexes the first flange outwardly as the fastener moves from the initial position to the final position.

10. The unit as set forth in claim 2 wherein:
    the fastener includes a head portion having a first outer diameter and a threaded portion having a second outer diameter;
    the first outer diameter is larger than the second outer diameter; and
    the head portion engages the first flange and the threaded portion fits between the first flange when the fastener is in the initial position.

11. The unit as set forth in claim 1 wherein the cage defines a slot to access the cavity and the fastener, and the slot aligns with the hole of the bus bar.

12. The unit as set forth in claim 1 wherein the cage includes a retention feature that engages the bus bar to secure the cage to the bus bar.

13. The unit as set forth in claim 1 wherein:
    the first flange protrudes outwardly into the cavity in a first orientation;
    the second flange protrudes outwardly into the cavity in a second orientation transverse to the first orientation of the first flange; and
    a portion of the fastener is disposed between the first and second flanges when the fastener is in the initial position to prevent tilting of the fastener in the cavity.

14. The unit as set forth in claim 1 wherein:
    the cage includes a top wall and a side wall disposed transverse to the top wall;
    the top wall and the side wall cooperate to surround the cavity;
    the first flange protrudes outwardly into the cavity from the side wall;
    the first flange defines a gap;
    the first flange splits the cavity into a first chamber and a second chamber;
    the fastener includes a head portion that rests on the first flange in the first chamber when the fastener is in the initial position and a threaded portion is disposed in the gap, the second chamber and the hole of the bus bar when the fastener is in the initial position;
    the top wall defines a slot to access the cavity and the fastener in the first chamber when the fastener is in the initial position;
    the slot of the top wall, the gap of the first flange and the hole of the bus bar align with each other;
    the second flange protrudes outwardly into the cavity from the top wall;
    the head portion of the fastener is disposed between the first and second flanges in the first chamber when the fastener is in the initial position to align the threaded portion of the fastener with the hole of the bus bar; and
    the fastener is movable from the first chamber in the initial position to the final position by a force applied to the head portion of the fastener which flexes the first flange outwardly toward the side wall as the head portion of the fastener moves from the first chamber to the second chamber.

15. A battery pack comprising:
    a module terminal includes a battery cell therein, and the module terminal includes a terminal nut that is accessible during an assembly process;
    a pre-assembled electrical connection unit positioned relative to the module terminal during the assembly process, and wherein the unit includes:
    a bus bar defining a hole;
    a cage defining a cavity; and
    a fastener disposed in the cavity and the cage surrounds the fastener;

wherein the cage is secured to the bus bar, and the fastener is in an initial position which positions the fastener in the hole of the bus bar and the cavity of the cage;

wherein the unit is placed over the terminal nut during the assembly process such that the fastener aligns with the terminal nut;

wherein the fastener is movable from the initial position to a final position relative to the cage which positions the fastener deeper in the hole of the bus bar and secures the bus bar to the module terminal; and wherein the cage includes a first flange and a second flange that each protrude outwardly into the cavity in an orientation different from each other.

16. The battery pack as set forth in claim 15 wherein the cage defines a slot to access the cavity and the fastener, and a force is applied to the fastener through the slot to move the fastener from the initial position to the final position in which the fastener is secured to the terminal nut.

17. The battery pack as set forth in claim 15 wherein the fastener rests on the first flange when the fastener is in the initial position.

18. The battery pack as set forth in claim 17 wherein the first flange splits the cavity into a first chamber and a second chamber, and wherein a portion of the fastener is disposed between the first and second flanges in the first chamber when the fastener is in the initial position to align the fastener in the cavity relative to the terminal nut.

19. The battery pack as set forth in claim 18 wherein the cage defines a slot to access the cavity and the fastener, and a force is applied to the fastener through the slot to move the fastener from the initial position to the final position in which the fastener flexes the first flange outwardly as the fastener moves from the first chamber to the second chamber and the fastener is secured to the terminal nut.

* * * * *